US011925599B2

(12) United States Patent
Schlack et al.

(10) Patent No.: US 11,925,599 B2
(45) Date of Patent: Mar. 12, 2024

(54) CONTAINER FOR TRANSPORTING A BIOPHARMACEUTICAL FLUID COMPRISING A SHAPE MEMORY MATERIAL

(71) Applicant: SARTORIUS STEDIM FMT SAS, Aubagne (FR)

(72) Inventors: Stefan Schlack, Göttingen (DE); Jean-Marc Cappia, Gemenos (FR)

(73) Assignee: SARTORIUS STEDIM FMT SAS., Aubagne (FR)

( * ) Notice: Subject to any disclaimer, the term of this patent is extended or adjusted under 35 U.S.C. 154(b) by 1124 days.

(21) Appl. No.: 16/307,736

(22) PCT Filed: Jun. 30, 2017

(86) PCT No.: PCT/EP2017/066371
§ 371 (c)(1),
(2) Date: Dec. 6, 2018

(87) PCT Pub. No.: WO2018/007265
PCT Pub. Date: Jan. 11, 2018

(65) Prior Publication Data

US 2019/0300238 A1 Oct. 3, 2019

(30) Foreign Application Priority Data

Jul. 7, 2016 (EP) .................................... 16315003

(51) Int. Cl.
*A61J 1/14* (2023.01)
*A61J 1/10* (2006.01)
(Continued)

(52) U.S. Cl.
CPC ............... *A61J 1/1468* (2015.05); *A61J 1/10* (2013.01); *A61J 1/14* (2013.01); *A61J 1/1493* (2013.01);
(Continued)

(58) Field of Classification Search
CPC .... A61J 1/1468; A61J 1/10; A61J 1/14; A61J 1/1493; B01L 3/505; B65D 11/18;
(Continued)

(56) References Cited

U.S. PATENT DOCUMENTS 6,076,457 A 6/2000 Vallot
6,759,481 B2 7/2004 Tong
(Continued)

FOREIGN PATENT DOCUMENTS

EP 0 276 994 A2 * 1/1988 ............ B65D 77/06
EP 0276994 A2 8/1988
(Continued)

OTHER PUBLICATIONS

International Search Report and Written Opinion of the International Searching Authority for PCT/EP2017/066371 dated Oct. 17, 2017.
(Continued)

*Primary Examiner* — Philip R Wiest
(74) *Attorney, Agent, or Firm* — Heslin Rothenberg Farley & Mesiti P.C.

(57) ABSTRACT

A container for transporting and/or processing a biopharmaceutical fluid, the container comprising a wall, the wall comprising a shape memory material being adapted to change shape when induced by an external stimulus, so that the container can be alternately in a collapsed state and in an unfolded state, the wall of the container in the unfolded state delimiting an internal cavity adapted to contain the biopharmaceutical fluid.

15 Claims, 3 Drawing Sheets

(51) Int. Cl.

| | |
|---|---|
| ***B01L 3/00*** | (2006.01) |
| ***B65D 6/16*** | (2006.01) |
| ***B65D 21/08*** | (2006.01) |
| ***B65D 77/06*** | (2006.01) |

(52) U.S. Cl.
CPC .............. *B01L 3/505* (2013.01); *B65D 11/18* (2013.01); *B65D 21/086* (2013.01); *B65D 77/06* (2013.01); *B01L 2200/185* (2013.01); *B01L 2300/12* (2013.01); *B01L 2300/123* (2013.01)

(58) Field of Classification Search
CPC .................. B65D 21/086; B65D 77/06; B65D 2200/185; B65D 2300/12; B65D 2300/123
See application file for complete search history.

(56) References Cited

U.S. PATENT DOCUMENTS

| | | | | | |
|---|---|---|---|---|---|
| 6,986,855 | B1 | 1/2006 | Hood et al. | | |
| 7,276,195 | B1 | 10/2007 | Tong | | |
| 7,422,714 | B1 | 9/2008 | Hood et al. | | |
| 7,690,621 | B2 * | 4/2010 | Grummon | F03G 7/065 | 251/11 |
| 2001/0037627 | A1 * | 11/2001 | Hausslein | B65D 33/30 | 53/455 |
| 2004/0074065 | A1 * | 4/2004 | Cheng | B64C 33/02 | 24/442 |
| 2007/0034818 | A1 * | 2/2007 | Grummon | F16K 31/025 | 251/129.01 |
| 2008/0302789 | A1 * | 12/2008 | Stevenson | B65D 11/28 | 220/666 |
| 2011/0202031 | A1 * | 8/2011 | Mihaylov | G01N 1/22 | 604/408 |

FOREIGN PATENT DOCUMENTS

| | | | |
|---|---|---|---|
| EP | 0326730 | A1 | 8/1989 |
| FR | 2781202 | A1 | 1/2000 |
| FR | 3017122 | A1 | 8/2015 |
| GB | 1051516 | | 12/1966 |
| WO | 2005118248 | A2 | 12/2005 |

OTHER PUBLICATIONS

International Preliminary Report on Patentability for International Application No. PCT/EP2017/066371 dated Jan. 8, 2019.

Extended European Search Report for European Patent Application No. 16315003.0 dated Dec. 15, 2016.

* cited by examiner

CONTAINER FOR TRANSPORTING A BIOPHARMACEUTICAL FLUID COMPRISING A SHAPE MEMORY MATERIAL

CROSS REFERENCE TO RELATED APPLICATIONS

This application is a national stage filing under section 371 of International Application No. PCT/EP2017/066371, filed on Jun. 30, 2017, published in English on Jan. 11, 2018 as WO 2018/007265 A1 which claims priority to European Patent Application No. 16315003.0, filed on Jul. 7, 2016, the entire disclosure of these applications being hereby incorporated herein by reference.

BACKGROUND

The invention relates to a container comprising a shape memory material for receiving, processing, transporting and/or storing a biopharmaceutical fluid. The invention relates also to a system for expanding/unfolding such a container, and a method for receiving, transporting and/or storing a biopharmaceutical fluid, in which such a system is implemented.

"Biopharmaceutical fluid" should be understood to mean a product derived from biotechnology (culture media, cell cultures, buffer solutions, artificial nutrition liquids, blood products and derivatives of blood products) or a pharmaceutical product or, more generally, a product intended to be used in the medical domain. Such a product is in liquid, paste or possibly powder form. The invention applies also to other products subject to similar requirements with regard to their packaging.

It is known practice to use rigid containers, for example made of stainless steel, in order to transport biopharmaceutical fluids. Such containers make it possible in particular to transport biopharmaceutical fluids over great distances, by ship or by aeroplane, from the place where the containers have been filled to the place where the fluids will finally be used. Since these biopharmaceutical fluids are often of high financial value, even often of high value for the health of individuals since they may be used for example to manufacture medicines intended for human health, it is essential that they reach their place of destination safely and without contamination.

However, one drawback with these rigid containers is that they occupy a significant space, even once emptied of biopharmaceutical fluid. Also, they require a lot of space in order to be stored between two uses.

Consequently, there is, in the specific field of the invention, the need to be able to transport a biopharmaceutical fluid safely, simply and economically, with a high capacity container.

SUMMARY OF THE INVENTION

To remedy the abovementioned problem, according to a first aspect, the invention relates to a container for transporting and/or processing a biopharmaceutical fluid, the container comprising a wall, the wall comprising a shape memory material being adapted to change shape when induced by an external stimulus, so that the container can be alternately in a collapsed state and in an unfolded state, the wall of the container in the unfolded state delimiting an internal cavity adapted to contain the biopharmaceutical fluid.

Thanks to the shape memory material, the container can easily change shape. The container can thus contain the biopharmaceutical fluid in the unfolded state, or be stored in the collapsed state while saving space.

In various embodiments according to the present invention, use may also possibly be made of one and/or the other of the following dispositions, taken separately or in combination, according to which:

- the internal cavity is completely surrounded by the wall so as to form a closed and sterile internal cavity;
- the wall comprises a top wall that is partially or completely open so as to form an opening emerging in the internal cavity;
- the wall comprises an inner face compatible with and/or neutral to the biopharmaceutical fluid, the biopharmaceutical fluid being directly in contact with the inner face;
- an internal pouch made of plastic material, flexible and leak-tight, is arranged in the internal cavity, the internal pouch being suited and intended to receive the biopharmaceutical fluid, wherein the internal pouch is reversibly fixed to the inner face, the internal pouch being an element distinct and separate from the container;
- an internal pouch made of plastic material, flexible and leak-tight, is arranged in the internal cavity, the internal pouch being suited and intended to receive the biopharmaceutical fluid, wherein the internal pouch is irreversibly fixed to the inner face of the container;
- the wall comprises at least one layer of shape memory material;
- the shape memory material is in the forms of filaments arranged in the wall of the container;
- the shape memory material is in a first shape when the container is in the collapsed state, the shape memory material being in a second shape when the container is in the unfolded state, the change from the first shape to the second shape of the shape memory material being induced by the external stimulus;
- the shape memory material is a shape memory polymer and/or a shape memory alloy;
- the shape memory material is a thermally or electrically induced shape memory material;
- the internal cavity has a capacity of between 100 litres and 1000 litres, even between 200 litres and 500 litres; and
- the container comprises a bottom wall linked to the lateral peripheral wall, the lateral peripheral wall being arranged vertically and transversely to the bottom wall such that the container in the unfolded state is in the form of a tank.

The invention also relates to a system comprising a container according to the invention and an internal pouch made of plastic material, flexible and leak-tight, adapted to be arranged in the internal cavity of the container, the internal pouch being suited and intended to receive the biopharmaceutical fluid.

The invention also relates to a system for expanding/collapsing a container according to the invention, comprising the container and a device for expanding the container, the expansion device comprising a source to induce a change of the shape memory material.

The invention also relates to a method for receiving and transporting biopharmaceutical fluid, in which:

- a system according to the invention is provided for expanding a container, the container being initially in the collapsed state, the expansion device induces a stimulus to change shape of the shape memory material of the wall, so that the container is in the unfolded state, the internal cavity of the container is filled with the biopharmaceutical fluid at a place of filling, notably via a filling inlet, the container is transported from the place of filling to a place of use of the biopharmaceutical fluid, at the place of use, the container is emptied of the biopharmaceutical fluid, notably via a draining outlet, the expansion device stops inducing the stimulus or induces another stimulus to change shape of the shape memory material of the wall, so that the container is in the collapsed state, and the container is transported back to the initial place of filling, or the container is discarded.

BRIEF DESCRIPTION OF THE DRAWINGS

A number of embodiments of the invention will now be described with the help of the drawings, in which.

DETAILED DESCRIPTION

Below is a detailed explanation of a number of embodiments of the invention together with examples and references to the drawings. Obviously, the invention is in no way limited to the embodiment(s) described by way of nonlimiting illustration.

The subject of the invention is a container 1 for receiving, processing, transporting and/or storing a biopharmaceutical fluid 2 (said container 1 hereinafter being referred to as "container").

The container 1 comprises a wall 3 delimiting an internal cavity 4. The internal cavity 4 of the container 1 is suited and intended to receive biopharmaceutical fluid 2. The qualifiers "internal" or "inner", and "external" or "outer" when applied to the container 1 reflect the fact that the container 1 delimits the internal cavity 4 in which the biopharmaceutical fluid 2 is placed. It is therefore with reference to this situation that these qualifiers should be understood. The container 1 may take any form, notably cylindrical, parallelepipedal or other so as to form the internal cavity 4. The container 1 may notably be in the form of a tank. In particular, the wall 3 comprises a bottom wall 3*a* and a lateral peripheral wall 3*c*. In the embodiment where the container 1 has a parallelepipedal form, the lateral peripheral wall 3*c* may be erected in four panels, two-by-two, at right angles or parallel to one another.

Figure 4:
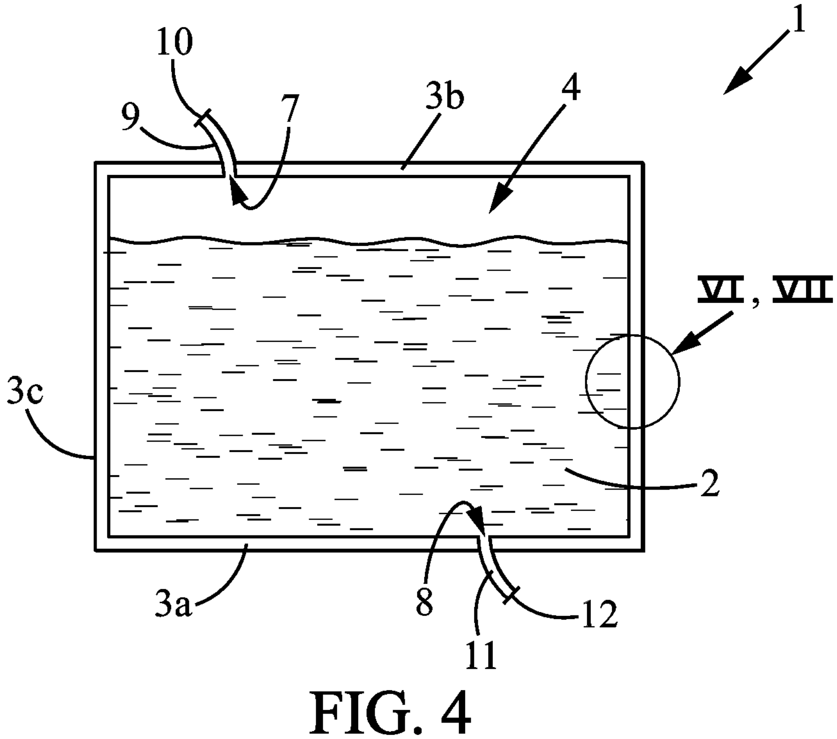
FIG. 4 is a schematic view of the container of FIG. 3 in the unfolded state, the internal cavity containing a biopharmaceutical fluid.

The wall may also comprise a top wall 3*b*. In a normal situation as represented in FIG. 4 in the unfolded state as explained below, the bottom wall 3*a* and, if appropriate, the top wall 3*b*, are arranged horizontally or substantially horizontally while the lateral peripheral wall 3*c* is arranged vertically or substantially vertically, possibly slightly flared from the bottom wall 3*a*. The description is given in relation to this situation. It is also with reference to this situation that the words "horizontal", "vertical", "bottom", "top" should be understood.

The wall 3 is delimited between an outer face 23 and an inner face 24, the terms "inner" and "outer" having to be understood as explained previously. Thus, the inner face 24 delimits more particularly the internal cavity 4 of the container 1.

Figure 5:
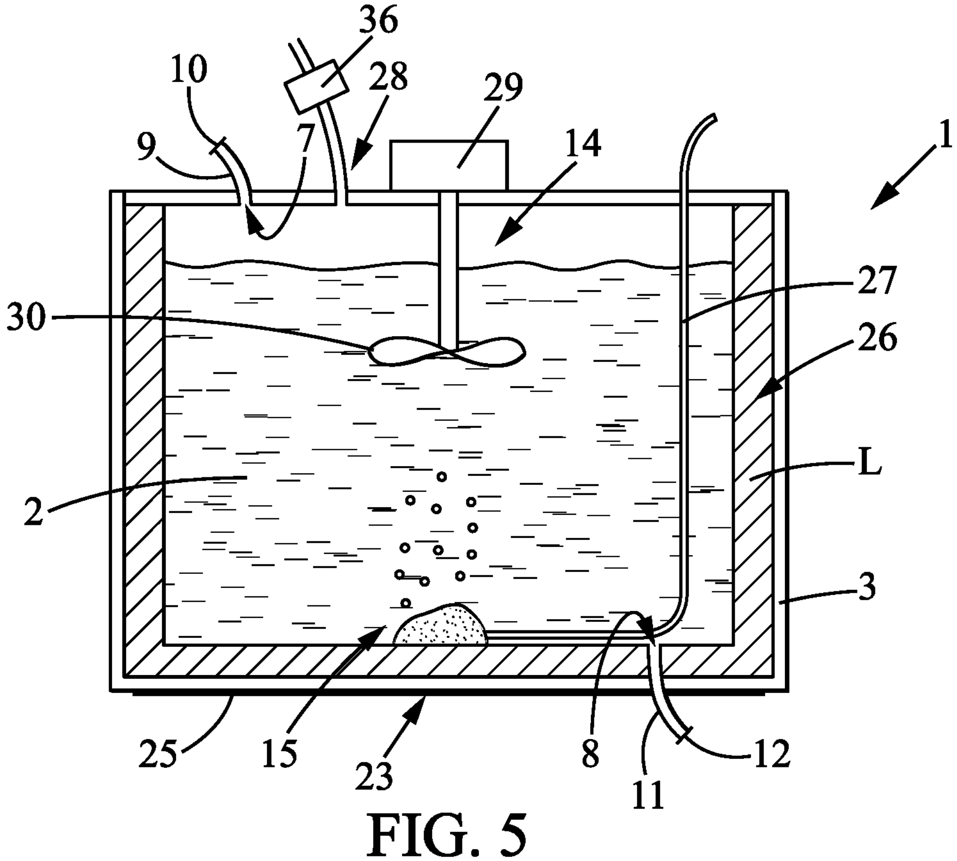
FIG. 5 is a schematic view of a container in the unfolded state comprising heating/cooling means, mixing means and aeration means.

As represented also in FIG. 5, the wall 3 may comprise as outer face 23 an external non-slip coating 25, for example made of ethylene vinyl acetate (EVA), silicon, or any other non-slip material. The non-slip coating 25 notably partially or completely covers the bottom wall 3*a*. Such a coating 25 makes it possible to ensure that the container 1 is held well and has a good stability, notably during the transportation.

According to one embodiment, the wall 3 of the container 1 may be at least partly transparent or translucent so as to view through the internal cavity 4 and the biopharmaceutical fluid 2. Moreover, the wall 3 of the container 1 may also be at least partly, even totally, opaque to light or to ultraviolet rays, for example to ensure optimal conservation of the biopharmaceutical fluid 2, notably if the biopharmaceutical fluid 2 is a photosensitive product.

Figure 3:
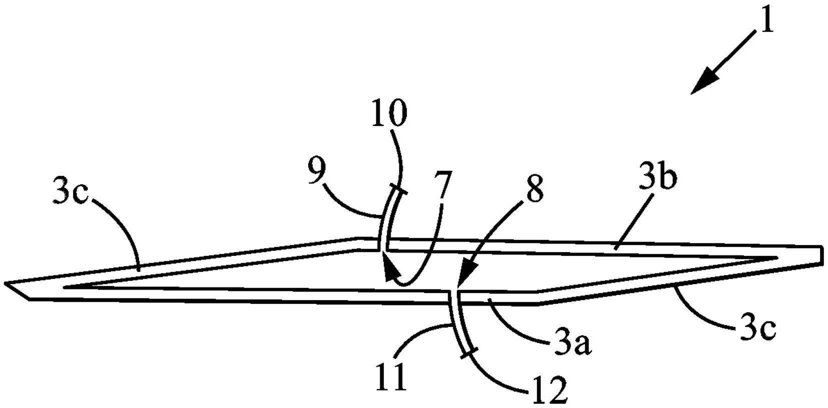
FIG. 3 is a schematic view of a container in the collapsed state according to a second embodiment.

According to a first embodiment as represented for example in FIGS. 3 and 4, the internal cavity 4 delimited by the wall 3 of the container 1 is a closed space. "Closed" should be understood to mean that the container 1 does not comprise any macroscopic or wide opening making it possible for an operator to directly access the internal cavity 4. In particular, the container 1 then comprises a top wall 3*b* completely closing the internal cavity 4. The bottom wall 3*a*, the top wall 3*b* and the lateral peripheral wall 3*c* are then secured to one another so as to form a container 1 of a single piece. The internal cavity 4 may consequently be sterile, that is to say free of any external contamination.

However, although delimiting a closed internal cavity 3, the container 1 is provided with at least one filling orifice 7, that is to say a passage for biopharmaceutical fluid 2, and at least one draining orifice 8, that is to say a passage for the biopharmaceutical fluid 2. The filling orifice 7 is more particularly situated in the top wall 3*b*. The draining orifice 8 is more particularly situated in the bottom wall 3*a* or in the bottom part of the lateral peripheral wall 3*c*.

A filling tube 9, having, at the opposite end, an inlet 10 for filling the internal cavity 4 with the biopharmaceutical fluid 2, is associated by a leak-tight link with the filling orifice 7 of the container 1. A draining tube 11, having, at the opposite end, an outlet 12 for emptying the internal chamber 4 of the biopharmaceutical fluid 2, is associated with the draining orifice 8 of the container 1.

"Seal-tight link" should be understood to mean a structure that is already known such that the wall 3 of the container 1 and the tube 9, 11 fluidically connected with the orifice 7, 8, are associated with one another in such a way as to both not allow any passage at the link between them, notably for the biopharmaceutical fluid 2 or a gas or possible contaminants.

The wall 3 of the container 1 and the tubes 9, 11 may notably form an indissociable secure whole or be linked together by coupling systems.

"Tube" should be understood to mean a hollow structure of greater or lesser length or shortness, the term also including a simple port.

As a variant, the container 1 may comprise a single filling and draining orifice. According to this variant, a single tube serving as tube for filling and tube for emptying the chamber of biopharmaceutical fluid 2 is then associated by a leak-tight link to an orifice of the container 1. According to yet another variant, the container 1 may comprise more than two filling and draining orifices, and therefore more than two filling and/or draining tubes.

Figure 1:
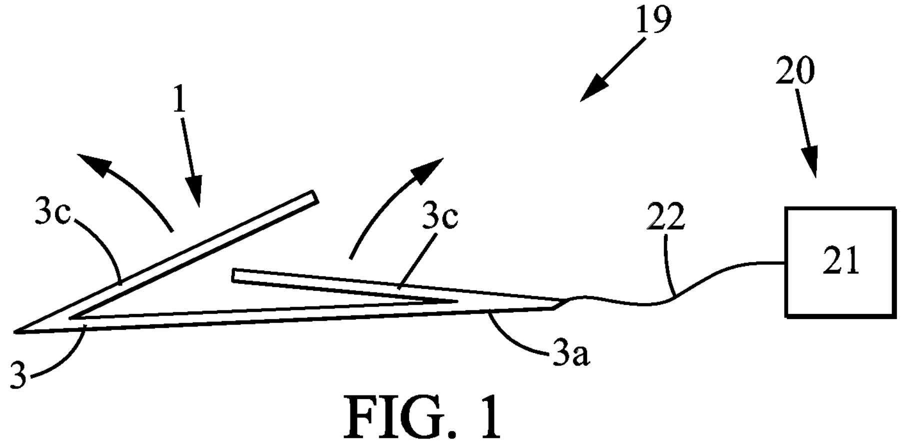
FIG. 1 is a schematic view of a container in a collapsed state according to a first embodiment.
Figure 2:
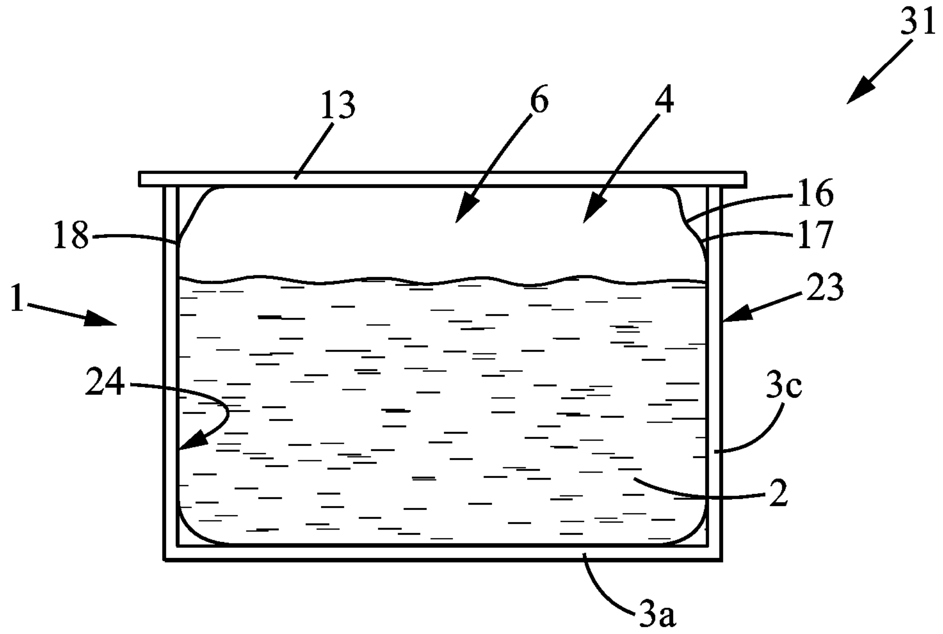
FIG. 2 is a schematic view of the container of FIG. 1 in an unfolded state, the top wall of the container being open, and an internal pouch being arranged in the internal cavity of the container containing a biopharmaceutical fluid.

According to a second embodiment as represented for example in FIGS. 1 and 2, the wall 3 may comprise an opening 6 making it possible to directly access the internal cavity 4 of the container 1. In particular, the top wall 3*b* may be partially or completely open. According to this second embodiment, a lid 13 may be used to alternately close or open the opening 6 of the container 1. The lid 13 may be provided with gripping and handling elements. If appropriate, elements are provided for locking the lid 13 in order to close, in particular in a fluid-tight manner, the opening 6.

According to this second embodiment in which the container 1 comprises an opening 6, the container 1 may also comprise a filling orifice 7 and/or a draining orifice 8 (not represented in FIGS. 1 and 2) as described previously, or a single filling and draining orifice.

According to the invention, the wall 3, of the container 1 comprises a shape memory material 5. By "shape memory material", it is understood a material that can reversibly go from a least one shape to another shape when a predetermined external stimulus is applied.

The stimulus applied to the wall 3 to change the state of the shape memory material 5 may be of any physical or chemical type, for example, but without being limited to, a temperature change, a chemical treatment, a magnetic field, an electric current, a light radiation, etc. Once, the shape memory material 5 has taken a particular shape, this shape is said to be constant, meaning that the wall 3 remains in said shape as long as a stimulus is applied. The stimulus can be only applied temporarily to trigger a change of shape of the shape memory material 5. As a variant, the stimulus needs to be applied permanently so that the shape memory material 5 retain its specific shape, the material 5 returning to its initial shape as soon as the stimulus stops.

According to an embodiment, the shape memory material 5 may retain more than two shapes. According to this embodiment, the shape memory material 5 may in particular retain three shapes. For instance, a first stimulus applied to the shape memory material 5 may trigger a change from a first shape to a second shape, whereas a second stimulus may trigger a change from the second shape to a third shape of the shape memory material 5.

The shape memory material 5 may be a shape memory polymer (SMP) and/or a shape memory alloy (SMA). SMPs are polymers that derive their name from their inherent ability to return to an original permanent shape after undergoing a temporary shape deformation. SMPs can be deformed to a temporary shape by processing through heating, deformation, and finally, cooling. As long as the SMPs remain below a glass transition temperature Tg, it holds the temporary shape indefinitely. When the SMPs are heated above its transition temperature Tg, it returns to its permanent shape. It is widely known to use such shape memory polymers in various industries. For instance, such shape memory polymers are described in U.S. Pat. Nos. 6,759,481, 6,986,855, 7,276,195, 7,422,714 or WO 2005118248.

SMAS can for instance be nitinol which is a metal alloy of nickel and titanium, in particular type 60 or type 55 nitinol. Nitinol has the ability to undergo deformation at one temperature, and then recovers its original, preformed shape upon heating above a transformation temperature.

Shape memory material 5 may be arranged locally in certain part of the wall 3. For instance, only the peripheral wall 3*c* comprises a shape memory material 5.

Figure 7:
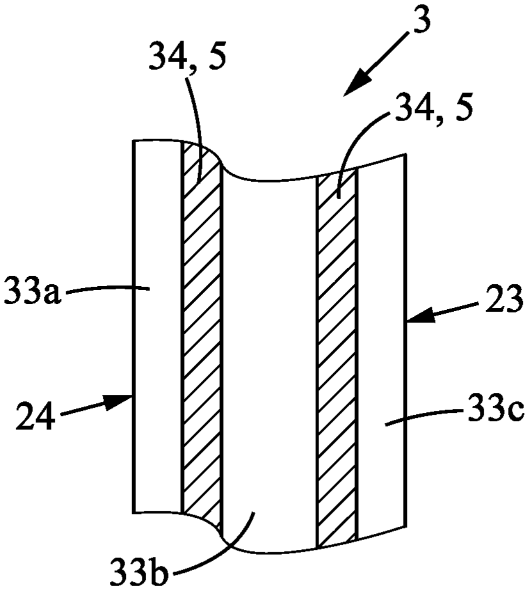

Besides, the shape memory material 5 can be arranged as one or several layers in the wall 3 of the container 1 and cover, entirely or partly, the surface of the wall 3. According to one embodiment, the wall 3 may comprise a number of layers superposed one on top of the other. Such superposed layers make it possible to obtain a good resistance of the wall 3, notably to impacts during transport operations. Thus, according to the embodiment represented in FIG. 7, the wall 3 may comprise at least one layer 34 of shape memory material 5 and other layers 33*a*, 33*b*, 33*c* of plastic material, for example made of polyvinyl chloride (PVC) or polyurethane. More particularly, in the embodiment illustrated in FIG. 7, the wall 3 comprises an overlap of two layers 34 of shape memory material 5 and three layers 33*a*, 33*b*, 33*c* of plastic material.

According to another embodiment, the shape memory material 5 may have other arrangements in the wall 3. The shape memory material 5 may be arranged to form a cellular structure, similar to corrugated cardboard, by bonding several sheets comprising a shape memory material 5. Such structure permits an improved change of the wall's shape when a stimulus is applied. Such a structure with a shape memory material 5 is described for instance in U.S. Pat. No. 7,690,621.

Figure 6:
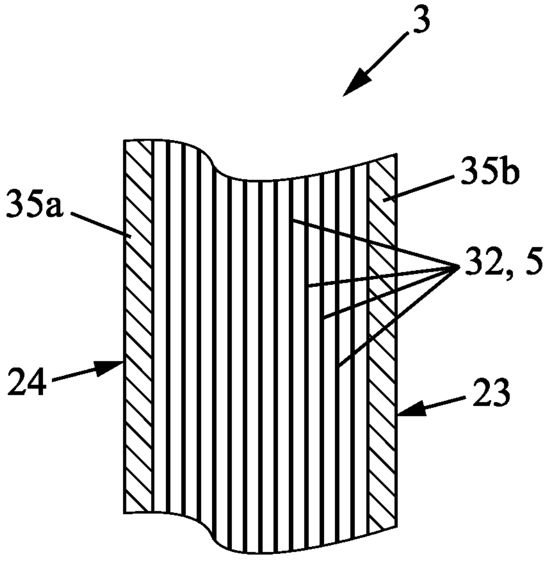
FIGS. 6 and 7 are enlarged views of the wall of the container of FIG. 4 according to two different arrangements of the shape memory material in the wall of the container respectively.

According to another embodiment represented in FIG. 6, the shape memory material 5 may be arranged in filaments 32 in the wall 3. The filaments 32 can be arranged in multiple different ways, for instance parallel to each other, or overlapping with each other. The filaments 32 are advantageously made of a shape memory alloys (SMA). According to this embodiment, the filaments 32 can be also used also to conduct heat to the container 1 and to the biopharmaceutical fluid 2. More particularly, in the embodiment illustrated in FIG. 6, the wall 3 comprises filaments 32 shape memory material 5 in between of two layers 35*a*, 35*b* of plastic material.

Thanks to the shape memory material 5, the container 1 is suited and intended to be collapsed or unfolded/expanded. Thus, the container 1 may alternately be in a collapsed state or in an unfolded state.

In this collapsed state, the container 1 occupies a minimal space as represented in FIG. 1 or 3, and may for example be folded. In particular, the container 1 is substantially flat. The shape memory material 5 is for instance in a first temporary shape.

After applying a stimulus, the shape memory material 5 comprised in the wall 3 triggers a change of shape of the container 1. For instance, the shape memory material 5 goes from the temporary shape to another second permanent shape. As a result, the container 1 goes from the collapsed state to the unfolded state. In the unfolded state, the container 1 is expanded in volume as represented notably in FIG. 2, 4 or 5. The container 1 then delimits the internal cavity 4 in order to contain the biopharmaceutical fluid 2. The peripheral lateral wall 3*c* then has, for example, a height H less than 1 metre, even equal to 70 centimetres. The bottom wall 3*a* then has a bottom surface area of less than 1 square metre, even equal to 0.83 square metre. Thus, the internal cavity 4 has sufficient volume to contain the biopharmaceutical fluid 2.

In the unfolded state, the container 1, notably the peripheral lateral wall 3*c*, is rigid or semi-rigid. "Rigid or semi-rigid" should be understood to mean that the container 1, notably the peripheral lateral wall 3*c*, is expanded as to have at least sufficient rigidity in order to support itself to contain the biopharmaceutical fluid 2. Furthermore, the container 1 has, in the unfolded state, a peripheral lateral wall 3*c* that is solid enough to protect the biopharmaceutical fluid 2 with which the internal cavity 4 is filled. In the unfolded state, the container 1 has a capacity of between 100 litres and 1000 litres, in particular between 200 and 500 litres, and it depends on the requirements and the applications.

The wall 3 may comprise a plurality of predetermined fold lines (not represented in the figures), allowing the wall 3 to flex along the fold lines to the collapsed state and unfold along the fold lines to the unfolded state. Such predetermined fold lines may be grooves or slots, in which the wall has a lower thickness between the outer face 23 and the inner face 24 so as to locally facilitate its deformation.

The wall 3 may be adapted to come directly into contact with the biopharmaceutical fluid 2. Thus, the inner face 24 may be neutral to and/or biocompatible with the biopharmaceutical fluid 2 which fills the container 1. In other words, the quality of the biopharmaceutical fluid 2 is not affected by its coming into contact with the inner face 24 of the container 1. As a result, the inner face 24 may be covered with or formed by low-density polyethylene (LDPE), ethylene vinyl alcohol (EVOH), high-density polyethylene (HDPE), polyethylene (PE), polyethylene terephthalate (PET), polyamide (PA), or ethylene vinyl acetate (EVA).

However, as a variant, the container 1 may also comprise an internal pouch 16, adapted to be interposed between the inner face 24 of the container 1 and the biopharmaceutical fluid 2. An internal pouch 16 may notably be used and arranged in the internal cavity 4 of the container 1 when the container 1 comprises an opening 6 according to the second embodiment as described previously and as represented in FIG. 2. Such an internal pouch 16 is for example described in patent FR 2781202.

The internal pouch 16 may be flexible and leak-tight. The internal pouch 16 is formed from a closed wall 17, made of plastic material. "Leak-tight" should be understood here to mean that the wall 17 of the internal pouch 16 does not allow any passage of biopharmaceutical fluid 2, of gas, or of possible contaminants. The internal pouch 16 is placed entirely in, that is to say inside of, the internal cavity 4 of the container 1.

The internal pouch 16 preferably has a form complementing that of the internal cavity 4 of the container 1. For example, in the embodiment in which the container 1 has a parallelepipedal form, the internal pouch 16 also has a parallelepipedal form in order to be shaped to and inserted easily in the internal cavity 4. Furthermore, the internal pouch 16, once filled with biopharmaceutical fluid, shapes itself to the form of the internal cavity 4 because of the pressure exerted by the biopharmaceutical fluid 2 on its wall 17.

The wall 17 of the internal pouch 16 may be simply positioned in the internal cavity 4 or may be fixed to the wall 3 of the container 1, for example on a common edge or a common lateral surface 18.

The wall 17 of the internal pouch 16 may be fixed to the container 1 by any means. In particular, the internal pouch 16 may be fixed to the container 1 reversibly for example using self-gripping means. According to this variant, the internal pouch 16 may thus be detached from the container 1, for example once the container 1 has been emptied of the biopharmaceutical fluid 2. The internal pouch 16 may then be an element that is distinct and separate from the container 1. The invention then also relates to a system 31 comprising a container 1 and an internal pouch 16 distinct from the container 1.

According to another variant, the internal pouch 16 may be fixed irreversibly, that is to say definitively, to the container 1. According to this variant, the internal pouch 16 may be fixed to the container 1 by gluing, by welding or by any other similar means.

The internal pouch 16 may be provided with an orifice, that is to say a passage for filling with the biopharmaceutical fluid 2 and an orifice, that is to say a passage for emptying the biopharmaceutical fluid 2.

A tube for filling the internal pouch 16 is associated with the filling orifice by leak-tight links having, at the opposite end, a filling inlet. A draining tube is associated with the draining orifice having, at the opposite end, a draining outlet.

As a variant, the internal pouch 16 may comprise a single orifice for filling and for draining. According to this variant, a single tube serving as tube for filling and tube for emptying the chamber of biopharmaceutical fluid 2 is then associated by a leak-tight link with the orifice of the internal pouch 16. According to yet another variant, the internal pouch 16 may comprise more than two filling and draining orifices, and therefore more than two filling and/or draining tubes.

Moreover, the filling tube and/or the draining tube may be formed in, respectively may pass through, the wall 3 of the container 1. As a variant, the filling tube and/or the draining tube may pass through the opening 6 of the container 1 if appropriate.

The internal pouch 16 is preferably at least partly, even totally, transparent or translucent so as to make it possible to view through, and in particular through the wall 17, the biopharmaceutical fluid 2. Moreover, the internal pouch 16 may also be at least partly, even totally, opaque to light or to ultraviolet rays for example to guarantee optimal conservation of the biopharmaceutical product 2, notably if the biopharmaceutical product 2 is a photosensitive product.

According to one embodiment, the container 1 may also comprise heating and/or cooling means intended to heat and/or cool the biopharmaceutical fluid 2 of the container 1. According to this embodiment, the wall 3 of the container 1 may be made of a material exhibiting a certain thermal conductivity, for example greater than that of stainless steel which is approximately 16 $W^{-1} \cdot m^{-1} \cdot k^{-1}$ at 23 degrees Celsius, so as to improve the implementation of the heating and/or cooling means.

Moreover, the wall 3 may comprise a heating and/or cooling means in the form of a chamber 26 adapted to contain a cooling and/or heating liquid L, as represented in FIG. 5. In this case, there may also be provided means for controlling the temperature of the biopharmaceutical fluid 2 in the container 1 and means for controlling the heating and/or cooling means. Such means for controlling the temperature are arranged in one or more ports provided for this purpose. There may also be provided means adapted to allow for the circulation, as a pump, particularly in closed circuit, of the cooling and/or heating liquid L, from the chamber 26 to a device for heating/cooling the liquid L advantageously external to the container 1.

According to one embodiment, as represented for example in FIG. 5, the container 1 may comprise mixing means 14. The mixing means 14 may for example take the form of one or more shafts fixed to the wall 3 of the container 1, suitable for being rotationally driven by a motor 29 situated outside the container 1 and for rotationally driving at least one mixing member 30. A mixing member 30 may for example take the form of a propeller having a hub supporting a number of blades. According to this embodiment, the container 1 comprises an opening in order to connect the shaft to the motor 29.

According to one embodiment, as represented for example in FIG. 5, the container 1 may also comprise aeration means 15 suitable for delivering to the content a certain quantity of aeration gas. These aeration means 15 thus make it possible to aerate the biopharmaceutical fluid 2 which is located in the internal cavity 4 of the container 1. The aeration means 15 may comprise means 27 for supplying aeration gas having at least one tubular element extending by fluidic connection from the outside of the container 2. The supply means 27 are advantageously fixed onto the inner face 24 of the wall in order not to risk interaction or to be in contact with the mixing means 14 as appropriate.

With the aeration means 15 which have just been described, there may be associated at least one aeration gas discharge orifice 28 formed in the top part of the wall 3 of the container 1. Such an aeration gas discharge orifice 28, which may be covered with an exhaust filter 36, makes it possible to discharge from the container 2, to the outside, the gas which has not been mixed with the content of the container 2.

To the abovementioned means there may also be added sensors of pH, oxygen measurement, conductivity and/or biomass type, via a port passing through the wall 3 of the container 1 by leak-tight link. In the case of the use of an internal pouch 16 as previously described, at least one sensor passes through the wall 17 of the internal pouch 16 and is placed partially in the internal cavity 4 via such a port.

The invention relates also to a system 19 for expanding/unfolding a container 1. The system 19 comprises the container 1 and a device 20 for expanding the container 1.

The expansion device 20 comprises a source of stimulus 21. The source of stimulus 21 can for instance be an electric source which can provide the wall 3 with an electric current to trigger a change of the shape memory material 5 of the wall 3. To this end, a line 22 can connect the source 21 to the wall 3 of the container 1. Alternatively, the expansion device 20 can be a heat source for instance, in the case that the shape of memory material depends on temperature change as external stimulus. As explained above, other types of sources can be used according to the shape memory material 5 used in the wall 3 of the container 1.

The invention relates also to a method for receiving and transporting biopharmaceutical fluid 2.

There is initially a system 19 comprising the container 1 and the expansion device 20. The container 1 is then in the collapsed state, empty of biopharmaceutical fluid 2.

The container 1 is expanded with the expansion device 20. In particular, a stimulus is provided to the wall 3 so that the shape memory material 5 changes its shape. The container 1 is then in the unfolded state.

The container 1 may then be separated from the expansion device 20 if the shape memory material 5 can retain its shape after stopping inducing the stimulus.

If appropriate, in particular according to the second embodiment described above in which the container 1 comprises an opening 6, the internal pouch 16 is introduced into the internal cavity 4 of the container 1.

Then, the internal cavity 4 of the container 1 is filled with biopharmaceutical fluid 2, notably via the filling inlet 10 of the container or the filling inlet of the internal pouch 16, then the filling inlet 10 is brought to the closed state, the draining outlet 12 being also in the closed state.

The container 1 may be loaded onto a ship, a truck, an aeroplane in order to transport the biopharmaceutical fluid 2. The biopharmaceutical fluid 2 may be processed after, before or during the transportation operations.

Following the transport operations, the container 1 is emptied of the biopharmaceutical fluid 2 by bringing the draining outlet 12 to the open state. The container 1 may thus be emptied of all of the biopharmaceutical fluid 2.

Once the biopharmaceutical fluid 2 has been transferred, the internal pouch 16 may be taken out of the container 1 if appropriate. The internal pouch 16 may be discarded, the pouch 16 being disposable.

The container 1 may also be disposable. The container 1 may then be discarded after use, notably after having been emptied of the biopharmaceutical fluid 2.

As a variant, the container 1 may be brought back to the collapsed state, for example by applying another stimulus to the wall 3 with the expansion device 20, or by stopping inducing the stimulus to the wall 3 with the expansion device 20 so that the shape memory material 5 can return to its initial shape. The container 1 can then be transported back to the initial place of filling. The container 1 may then be reused for the future transportation of another biopharmaceutical fluid 2 with, if necessary, the introduction of a new internal pouch 16 therein.

The method described above may be carried out partially, the steps described above being able to be carried out independently of one another.

Obviously, the invention is not limited to the embodiments described previously and given purely by way of example. It encompasses a wide range of modifications, alternative forms and other variants that a person skilled in the art will be able to envisage within the scope of the present invention and notably all combinations of the different modes of operation described previously, being able to be taken separately or together.

The invention claimed is:

1. A container for processing and/or transporting a biopharmaceutical fluid, the container comprising a wall, the wall comprising a shape memory material being adapted to change shape when induced by a stimulus external to the container, so that the container can be alternately in a collapsed state and in an unfolded state, the wall of the container in the unfolded state delimiting an internal cavity of the container adapted to contain the biopharmaceutical fluid, the container being coupled to an external device to provide said stimulus to the wall of the container from a position that is external to the interior cavity of the container, wherein the container is substantially flat in the collapsed state.

2. The container according to claim 1, wherein the internal cavity is completely surrounded by the wall so as to form a closed and sterile internal cavity.

3. The container according to claim 1, wherein the wall comprises a top wall that is partially or completely open so as to form an opening emerging in the internal cavity.

4. The container according to claim 1, wherein the wall comprises an inner face compatible with and/or neutral to the biopharmaceutical fluid, the biopharmaceutical fluid being directly in contact with the inner face.

5. The container according claim 1, wherein an internal pouch made of plastic material, flexible and leak-tight, is arranged in the internal cavity, the internal pouch being suited and intended to receive the biopharmaceutical fluid, wherein the internal pouch is reversibly fixed to the inner face, the internal pouch being an element distinct and separate from the container.

6. The container according to claim 1, wherein an internal pouch made of plastic material, flexible and leak-tight, is arranged in the internal cavity, the internal pouch being suited and intended to receive the biopharmaceutical fluid, wherein the internal pouch is irreversibly fixed to the inner face of the container.

7. The container according to claim 1, wherein the wall comprises at least one layer of shape memory material.

8. The container according to claim 1, wherein the shape memory material is in the form of filaments arranged in the wall of the container.

9. The container according to claim 1, wherein the shape memory material is in a first shape when the container is in the collapsed state, the shape memory material being in a second shape when the container is in the unfolded state, the change from the first shape to the second shape of the shape memory material being induced by the external stimulus.

10. The container according to claim 1, wherein the shape memory material is a shape memory polymer and/or a shape memory alloy.

11. The container according to claim 1, wherein the shape memory material is a thermally or electrically induced shape memory material.

12. The container according to claim 1, wherein the internal cavity has a capacity of between 100 litres and 1000 litres.

13. The container according to claim 1, comprising a bottom wall linked to the lateral peripheral wall, the lateral peripheral wall being arranged vertically and transversely to the bottom wall such that the container in the unfolded state is in the form of a tank.

14. A method for facilitating receiving and transporting biopharmaceutical fluid, comprising:

providing the container of claim 1;

expanding the container using the external device to induce a stimulus to change shape of the memory material of the wall to arrange the container in the unfolded state from the collapsed state; and filling the internal cavity of the container in the unfolded state with biopharmaceutical fluid.

15. The container according to claim 1, wherein the wall comprises a sufficient rigidity to support itself in the unfolded state prior to containment of the biopharmaceutical fluid.

* * * * *